(12) United States Patent
Yamamoto et al.

(10) Patent No.: US 9,100,948 B2
(45) Date of Patent: Aug. 4, 2015

(54) COMMUNICATION SYSTEM AND RESOURCE CONTROL METHOD

(75) Inventors: Hirotsugu Yamamoto, Osaka (JP); Kenichi Murakami, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 283 days.

(21) Appl. No.: 13/881,234

(22) PCT Filed: Oct. 6, 2011

(86) PCT No.: PCT/JP2011/073083
§ 371 (c)(1),
(2), (4) Date: Apr. 24, 2013

(87) PCT Pub. No.: WO2012/063581
PCT Pub. Date: May 18, 2012

(65) Prior Publication Data
US 2013/0217403 A1    Aug. 22, 2013

(30) Foreign Application Priority Data

Nov. 10, 2010  (JP) .................. 2010-251531

(51) Int. Cl.
*H04W 72/00* (2009.01)
*H04W 72/04* (2009.01)
*H04W 76/06* (2009.01)

(52) U.S. Cl.
CPC .............. *H04W 72/04* (2013.01); *H04W 72/00* (2013.01); *H04W 76/068* (2013.01)

(58) Field of Classification Search
CPC .... H04W 72/04; H04W 72/00; H04W 76/068
USPC ........... 455/436–444, 450–453; 370/331–338
See application file for complete search history.

(56) References Cited

U.S. PATENT DOCUMENTS 8,867,490 B1* 10/2014 Krishna et al. ................ 370/331
2008/0089290 A1* 4/2008 Coulas et al. ................. 370/331
(Continued)

FOREIGN PATENT DOCUMENTS

JP    2010-239608 A    10/2010

OTHER PUBLICATIONS

Samsung, Verizon Wireless, Qualcomm Incorporated, LG Electronics, LIPA deactivation, [online], 3GPP TSG SA WG2 Meeting #80 S2-104399, Aug. 30, 2010, [retrieved on Oct. 20, 2011], retrieved from the Internet: <URL:http://www.3gpp.org/ftp/tsg_sa/WG2_Arch/TSGS2_80_Brunstad/Docs/S2-104399.zip>.

(Continued)

*Primary Examiner* — Sharad Rampuria
(74) *Attorney, Agent, or Firm* — Drinker Biddle & Reath LLP

(57) ABSTRACT

A resource used by a wireless terminal device to communicate with a terminal device in an internal network is appropriately managed. In a communication system 201, an internal network connection device 102 allocates, to a wireless terminal device 150, 151, its own resource for communicating with a terminal device 161 in an internal network 51, transmits data received from the wireless terminal device 150, 151 via the wireless base station device 101, to the terminal device 161, and transmits data received from the terminal device 161, to the wireless terminal device 150, 151 via the wireless base station device 101. The internal network connection device 102 or the wireless base station device 101 determines whether or not the allocation of the resource to the wireless terminal device 150, 151 should be maintained. Upon receiving a determination that the allocation of the resource should not be maintained, the internal network connection device 102 cancels the allocation of the resource.

13 Claims, 13 Drawing Sheets

(56) References Cited

U.S. PATENT DOCUMENTS

| | | | |
|---|---|---|---|
| 2010/0234000 A1 | 9/2010 | Mase | |
| 2011/0274087 A1* | 11/2011 | Liang et al. | 370/331 |
| 2012/0071168 A1* | 3/2012 | Tomici et al. | 455/445 |
| 2014/0161055 A1* | 6/2014 | Chitrapu et al. | 370/329 |
| 2014/0219179 A1* | 8/2014 | Zakrzewski | 370/328 |

OTHER PUBLICATIONS

NEC, LIPA PDP Context/PDN Connection Deactiviation, 3GPP [online], TSG SA WG2 Meeting #82 S2-105661, Nov. 15, 2010, [retreived on Oct. 20, 2011], Retrieved from the Internet: URL:http://www.3gpp.org/ftp/tsg_sa/WG2_Arch/TSGS2_82_Jacksonville/Docs/S2-105661.zip, pp. 1-3.

Nokia Siemens Networks, Nokia Discussion on LIPA PDN Connection release, [online], 3GPP TSG SA WG2 Meeting #82 S2-105716, Nov. 15, 2010, [retrieved on Oct. 20, 2011], Retrieved from the Internet:URL:http://www.3gpp.org/ftp/tsg_sa/WG2_Arch/TSGS2_82_Jacksonbille/Docs/S2-105716.zip, pp. 1-3.

3rd Generation Partnership Project; Technical Specification Group Service and System Aspects; Local IP Access and Selected IP Traffic Offload (Release 10), 3GPP 23.829 V1.3.0, 3GPP, Sep. 2010, pp. 1-44.

* cited by examiner

COMMUNICATION SYSTEM AND RESOURCE CONTROL METHOD

TECHNICAL FIELD

The present invention relates to a communication system and a resource control method. More particularly, the present invention relates to a communication system and a resource control method, which enable a wireless terminal device to access an internal network via a wireless base station device.

BACKGROUND ART

In conventional mobile communication systems, communication services have been provided by wireless base station devices (hereinafter also referred to as macro base stations or eNBs (e NodeBs)) each forming a cell having a radius ranging from several hundreds of meters to several tens of kilometers, i.e., an area in which wireless terminal devices are allowed to communicate with the wireless base station device.

In recent years, with a dramatic increase in the number of subscribers of mobile communication services and an increase in communication traffic due to data communication, it is desired to distribute the subscribers and the communication traffic over cells having smaller radii, and to reliably provide users with a certain level of communication speed. Further, as a countermeasure against blind zones caused by skyscrapers, it is desired to install wireless base station devices in office floors and ordinary houses.

In association with these requirements, downsizing of wireless base station devices has progressed by remarkable improvement in throughput of various devices used in the wireless base station devices, and downsized base stations have attracted attention.

Such downsized base stations (hereinafter also referred to as femto base stations or HeNBs (Home e NodeBs)) form femto cells, and each femto cell has a radius as small as about 10 meters. Therefore, it is considered that the femto base stations are used in places outside macro cells formed by macro base stations, or places where it is difficult to install macro base stations, such as homes, underground malls, and the like.

As a function for a wireless terminal device (hereinafter also referred to as a UE (User Equipment)) to access a terminal device provided in a LAN (Local Area Network) via a HeNB, LIPA (Local IP Access) is defined in 3GPP (Third Generation Partnership Project).

The LIPA is a function that enables a UE to access a LAN by using not a global IP (Internet Protocol) address assigned by a mobile communications carrier network but a local IP address for accessing the LAN.

For example, Non-Patent Literature 1 (3GPP SPEC 23.829 V1.3.0 2010.9) discloses a local gateway device (hereinafter also referred to as an L-GW). When a UE accesses a terminal device in a LAN via a HeNB, the L-GW gives a local IP address to the UE, and performs a data relaying process or the like.

The LIPA is used, for example, when a user downloads a video file from a hard disk recorder in a home LAN onto a cellular phone to watch a program.

CITATION LIST

Non Patent Literature

Non-Patent Literature 1: 3GPP SPEC 23.829 V1.3.0 2010.9

SUMMARY OF THE INVENTION

Problems to be Solved by the Invention

By the way, when a UE having a LIPA connection, i.e., a UE to which a resource (hereinafter also referred to as a LIPA resource) for communicating with a terminal device in a LAN is allocated by an L-GW, has ended access to the terminal device in the LAN, the L-GW needs to release the LIPA resource allocated to the UE.

Further, when a UE communicating with a terminal device in the LAN by using a LIPA resource has performed handover from a HeNB to a eNB, the eNB as a handover destination transmits a notification about the handover of the UE, to the L-GW via, for example, an MME (Mobility Management Entity), and then the L-GW needs to release the LIPA resource allocated to the UE.

However, depending on the configuration of the mobile communication system, there are cases where such a notification from the MME to the L-GW cannot be performed. In these cases, the L-GW remains in the state where it allocates, to the UE, the LIPA resource that is not used.

Then, other UEs cannot use the LIPA resource, and the number of UEs that can simultaneously access the terminal device in the LAN via the L-GW is decreased. Further, when the UE that has performed handover again enters the range of the HeNB, the UE may attempt to be again allocated the LIPA resource and access the terminal device in the LAN. However, in this case, the L-GW may determine that the LIPA resource has already been allocated to the UE, and refuse allocation of the LIPA resource, leading to a possibility that the UE cannot use the LIPA resource.

The present invention has been made to solve the above-described problems, and an object of the present invention is to provide a communication system and a resource control method, which are capable of appropriately managing a resource that is used by a wireless terminal device to communicate with a terminal device in an internal network.

Solution to the Problems (1) In order to solve the above-described problems, a communication system according to an aspect of the present invention includes a wireless base station device for transmitting/receiving a radio signal to/from a wireless terminal device, and an internal network connection device connected between the wireless base station device and an internal network. The internal network connection device allocates, to the wireless terminal device, its own resource for communicating with a terminal device in the internal network, transmits data received from the wireless terminal device via the wireless base station device, to the terminal device in the internal network, and transmits data received from the terminal device in the internal network, to the wireless terminal device via the wireless base station device. The internal network connection device or the wireless base station device determines whether or not the allocation of the resource to the wireless terminal device should be maintained. Upon receiving a determination that the allocation of the resource should not be maintained, the internal network connection device cancels the allocation of the resource.

According to this configuration, the determination whether to release the resource and the process of releasing the resource can be performed on the internal network side, that is, in the wireless base station device or the internal network connection device. Therefore, it is possible to autonomously release the resource on the internal network side. Accordingly, it is possible to appropriately manage the resource which is used by the wireless terminal device to communicate with the terminal device in the internal network.

(2) Preferably, when communication between the wireless terminal device and the terminal device in the internal network via the internal network connection device has not been performed for a predetermined time or more, the internal network connection device or the wireless base station device determines that the allocation of the resource to the wireless terminal device should not be maintained.

According to this configuration, the resource which has not been used for a certain period can be appropriately released.

(3) Preferably, when the wireless terminal device has become incommunicable with the wireless base station device, the wireless base station device determines that the allocation of the resource to the wireless terminal device should not be maintained.

According to this configuration, for example, the resource, which has been used by a wireless terminal device that has moved out of the range of the wireless base station device, can be appropriately released.

(4) Preferably, when the wireless terminal device is not communicable with the wireless base station device, and the communication between the wireless terminal device and the terminal device in the internal network via the internal network connection device has not been performed for a predetermined time or more, the internal network connection device or the wireless base station device determines that the allocation of the resource to the wireless terminal device should not be maintained.

As described above, since the resource is released on condition both that the resource has not been used for a certain period and that the wireless terminal device has become incommunicable with the wireless base station device, it is possible to appropriately release the resource.

(5) More preferably, in the state where the communication has not been performed for the predetermined time or more, the wireless base station device confirms whether or not the wireless terminal device is communicable with the wireless base station device. When the wireless terminal device is not communicable with the wireless base station device, the wireless base station device determines that the allocation of the resource to the wireless terminal device should not be maintained.

According to this configuration, when the wireless terminal device, which no longer accesses the terminal device in the internal network but exists in the range of the wireless base station device, resumes the access, the wireless terminal device need not execute the LIPA connection establishment process again, thereby enhancing the efficiency of the process in the communication system.

More preferably, the wireless base station device monitors the communication between the wireless terminal device and the terminal device in the internal network via the internal network connection device, and when the communication has not been performed for a predetermined time or more, the wireless base station device confirms whether or not the wireless terminal device is communicable with the wireless base station device.

According to this configuration, the internal network connection device need not transmit idle communication information to the wireless base station device, thereby enhancing the efficiency of the process in the communication system.

More preferably, the internal network connection device monitors the communication between the wireless terminal device and the terminal device in the internal network via the internal network connection device, and when the communication has not been performed for the predetermined time or more, the internal network connection device transmits idle communication information to the wireless base station device. Upon receiving the idle communication information, the wireless base station device confirms whether or not the wireless terminal device is communicable with the wireless base station device.

According to this configuration, the wireless base station device side need not have the function of monitoring the communication between the wireless terminal device and the terminal device in the internal network via the internal network connection device, thereby achieving load balancing between the wireless base station device and the internal network connection device.

(6) More preferably, when the communication between the wireless terminal device and the terminal device in the internal network via the internal network connection device has not been performed for a predetermined time or more after the wireless terminal device became incommunicable with the wireless base station device, the internal network connection device or the wireless base station device determines that the allocation of the resource to the wireless terminal device should not be maintained.

According to this configuration, when the wireless terminal device, which has moved out of the range of the wireless base station device, again enters the range of the wireless base station device in a short time, the wireless terminal device need not execute the process of establishing a connection for access to the internal network, thereby enhancing the efficiency of the process in the communication system.

More preferably, the wireless base station device monitors whether or not the wireless terminal device is communicable with the wireless base station device. After the wireless terminal device has become incommunicable with the wireless base station device, the wireless base station device monitors the communication between the wireless terminal device and the terminal device in the internal network via the internal network connection device.

According to this configuration, the internal network connection device need not have the function of monitoring the communication between the wireless terminal device and the terminal device in the internal network via the internal network connection device, thereby achieving load balancing between the wireless base station device and the internal network connection device.

More preferably, the wireless base station device monitors whether or not the wireless terminal device is communicable with the wireless base station device, and when the wireless terminal device has become incommunicable with the wireless base station device, the wireless base station device transmits radio link disconnection information to the internal network connection device. Upon receiving the radio link disconnection information, the internal network connection device monitors the communication between the wireless terminal device and the terminal device in the internal network via the internal network connection device.

According to this configuration, the wireless base station device need not have the function of monitoring the communication between the wireless terminal device and the terminal device in the internal network via the internal network connection device, thereby achieving load balancing between the wireless base station device and the internal network connection device.

(7) Preferably, when the predetermined time has elapsed from when the communication between the wireless terminal device and the terminal device in the internal network via the internal network connection device became not to be performed, the internal network connection device or the wireless base station device determines that the allocation of the resource to the wireless terminal device should not be maintained. When the wireless terminal device has become incommunicable with the wireless base station device, even if the predetermined time has not elapsed from when the communication became not to be performed, the wireless base station device determines that the allocation of the resource to the wireless terminal device should not be maintained.

According to this configuration, for example, the resource, which has been used by a wireless terminal device that has moved out of the range of the wireless base station device, can be promptly released.

More preferably, the wireless base station device monitors the communication between the wireless terminal device and the terminal device in the internal network via the internal network connection device, and monitors whether or not the wireless terminal device is communicable with the wireless base station device.

According to this configuration, the internal network connection device need not have the function of monitoring the communication between the wireless terminal device and the terminal device in the internal network via the internal network connection device, thereby achieving load balancing between the wireless base station device and the internal network connection device.

More preferably, the internal network connection device monitors the communication between the wireless terminal device and the terminal device in the internal network via the internal network connection device, and the wireless base station device monitors whether or not the wireless terminal device is communicable with the wireless base station device.

According to this configuration, the wireless base station device need not have the function of monitoring the communication between the wireless terminal device and the terminal device in the internal network via the internal network connection device, thereby achieving load balancing between the wireless base station device and the internal network connection device.

(8) Preferably, when the wireless terminal device perform is handover to another wireless base station device, the wireless base station device transmits, to the internal network connection device, a resource release request indicating a request to cancel the allocation of the resource to the wireless terminal device, in advance of or in parallel with transmitting, to the wireless terminal device, a handover instruction indicating an instruction that causes the wireless terminal device to perform handover. Upon receiving the resource release request, the internal network connection device cancels the allocation of the resource.

According to this configuration, even if there is no notification from the handover destination, such as when a terminal information release instruction from the MME or the like does not arrive, it is possible to reliably release the resource.

(9) Preferably, when the wireless terminal device performs handover to another wireless base station device, if the communication between the wireless terminal device and the terminal device in the internal network via the internal network connection device has not been performed for a predetermined time or more from when the wireless base station device transmitted, to the wireless terminal device, a handover instruction indicating an instruction that causes the wireless terminal device to perform handover, the wireless base station device transmits, to the internal network connection device, a resource release request indicating a request to cancel the allocation of the resource to the wireless terminal device. Upon receiving the resource release request, the internal network connection device cancels the allocation of the resource.

According to this configuration, even if there is no notification from the handover destination, such as when a terminal information release instruction from the MME or the like does not arrive, it is possible to reliably release the resource. In addition, even when a failure of handover occurs, the wireless terminal device need not execute the process of establishing a connection to access the internal network, thereby enhancing the efficiency of the process in the communication system.

(10) Preferably, the communication system includes a plurality of the wireless base station devices, a plurality of the communication control devices are provided, and at least two of the wireless base station devices are connected to different communication control devices, respectively.

In this communication system, when the wireless terminal device has performed handover, it is difficult to receive a notification as a resource release instruction from the MME or the like. Therefore, more remarkable effect can be achieved by transmitting the resource release request to the internal network connection device in advance of or in parallel with transmitting the handover instruction to the wireless terminal device.

(11) Preferably, the wireless base station device is a HeNB (Home e NodeB) defined in 3GPP, and the internal network connection device is an L-GW (Local Gateway) defined in 3GPP.

(12) Preferably, the communication control device is an S-GW (Serving Gateway) defined in 3GPP.

According to this configuration, the resource, which is used by the wireless terminal device to communicate with the terminal device in the internal network, can be appropriately managed by using the LIPA function defined in 3GPP.

(13) In order to solve the above-described problems, a resource control method according to an aspect of the present invention is a resource control method used in a communication system including: a wireless base station device for transmitting/receiving a radio signal to/from a wireless terminal device; and an internal network connection device connected between the wireless base station device and an internal network, the internal network connection device transmitting data received from the wireless terminal device via the wireless base station device, to a terminal device in the internal network, and transmitting data received from the terminal device in the internal network to the wireless terminal device via the wireless base station device. The method includes: a step in which the internal network connection device allocates, to the wireless terminal device, its own resource for communicating with the terminal device in the internal network; a step in which the internal network connection device or the wireless base station device determines whether or not the allocation of the resource to the wireless terminal device should be maintained; and a step in which the internal network connection device cancels the allocation of the resource, upon receiving a determination that the allocation of the resource should not be maintained.

According to this configuration, the determination whether to release the resource and the process of releasing the resource can be performed on the internal network side, that is, in the wireless base station device or the internal network connection device. Therefore, it is possible to autonomously release the resource on the internal network side. Accordingly, it is possible to appropriately manage the resource which is used by the wireless terminal device to communicate with the terminal device in the internal network.

Advantageous Effects of the Invention

According to the present invention, it is possible to appropriately manage a resource which is used by a wireless terminal device to communicate with a terminal device in an internal network.

DESCRIPTION OF EMBODIMENTS

Figure 1:
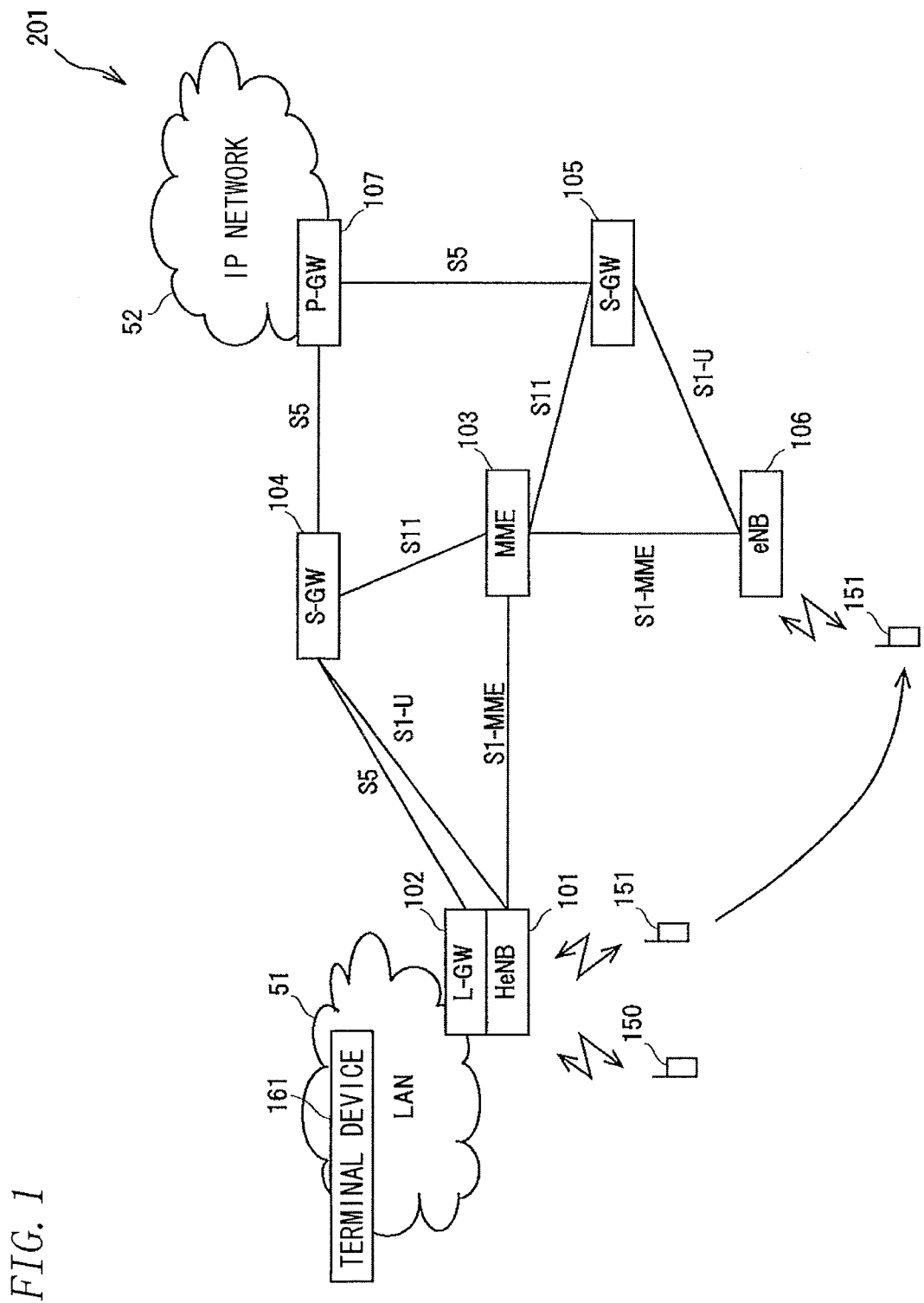
FIG. 1 is a diagram illustrating a configuration of a wireless communication system according to an embodiment of the present invention.

Hereinafter, embodiments of the present invention will be described with reference to the drawings. In the drawings, the same or corresponding parts are denoted by the same reference numerals, and will not be repeatedly described.

[Configuration and Fundamental Operation]

FIG. 1 is a diagram illustrating a configuration of a wireless communication system according to an embodiment of the present invention.

With reference to FIG. 1, a wireless communication system 201 is, for example, a mobile communication system that complies with LTE (Long Term Evolution) standardized by the 3GPP, and includes a HeNB (wireless base station device) 101, an L-GW (internal network connection device) 102, an MME (Mobility Management Entity) 103, S-GWs (communication control devices) 104 and 105, a eNB (wireless base station device) 106, and a P-GW 107. The L-GW 102 and the HeNB 101 may be housed in the same casing or in different casings. Although two wireless base station devices and two S-GWs are representatively shown in FIG. 1, less or more wireless base station devices and S-GWs may be provided.

The HeNB 101 and the eNB 106 each transmit/receive a radio signal to/from a UE to communicate with the UE. In the present embodiment, it is assumed that UEs 150 and 151 are present in the wireless communication system 201.

The L-GW 102 is connected between the HeNB 101 and a LAN (internal network) 51. The L-GW 102 can provide a plurality of UEs with LIPA connections, for example. The L-GW 102 allocates, to the UEs, its own resource for communicating with a terminal device 161 in the LAN 51.

Specifically, the L-GW 102 gives a local IP address to each UE 150, 151, and performs a data relaying process or the like when the UE 150, 151 accesses the terminal device 161 in the LAN 51 via the HeNB 101. That is, the L-GW 102 transmits data received from the UE 150, 151 via the HeNB 101, to the terminal device 161 in the LAN 51, and transmits data received from the terminal device 161 in the LAN 51, to the UE 150, 151 via the HeNB 101.

The HeNB 101 and the L-GW 102 each have the LIPA function defined in the 3GPP, and enable communication between the UE 150, 151 and the terminal device 161 in the LAN 51.

The S-GW 104 is connected between the HeNB 101 and an IP network (external network) 52. The S-GW 104 transmits data received from the UE 150, 151 via the HeNB 101, to the IP network 52 via the P-GW 107, and transmits data received from another device in the IP network 52 via the P-GW 107, to the UE 150, 151 via the HeNB 101.

The MME 103 transmits/receives a control message to/from the HeNB 101, and transmits/receives a control message to/from the eNB 106.

The HeNB 101 transmits/receives IP packets to/from the IP network 52 via the S-GW 104 and the P-GW 107.

The eNB 106 transmits/receives IP packets to/from the IP network 52 via the S-GW 105 and the P-GW 107.

The HeNB 101 and the S-GW 104 transmit/receive communication data that complies with an S1-U interface as a logical interface, to/from each other, thereby exchanging various kinds of information via the S1-U interface.

The HeNB 101 and the MME 103 transmit/receive communication data that complies with an S1-MME interface as a logical interface, to/from each other, thereby exchanging various kinds of information via the S1-MME interface.

The eNB 106 and the S-GW 105 transmit/receive communication data that complies with the S1-U interface as a logical interface, to/from each other, thereby exchanging various kinds of information via the S1-U interface.

The eNB 106 and the MME 103 transmit/receive communication data that complies with the S1-MME interface as a logical interface, to/from each other, thereby exchanging various kinds of information via the S1-MME interface.

The L-GW 102 and the S-GW 104 transmit/receive communication data that complies with an S5 interface as a logical interface, to/from each other, thereby exchanging various kinds of information via the S5 interface.

The MME 103 and the S-GW 104, 105 transmit/receive communication data that complies with an S11 interface as a logical interface, to/from each other, thereby exchanging various kinds of information via the S11 interface.

The S-GW 104, 105 and the P-GW 107 transmit/receive communication data that complies with the S5 interface as a logical interface, to/from each other, thereby exchanging various kinds of information via the S5 interface.

The L-GW 102 or the HeNB 101 determines whether or not the resource allocation to the UE 150, 151 should be maintained. Upon receiving a determination that the resource allocation should not be maintained, the L-GW 102 cancels the resource allocation to the UE 150, 151.

That is, even if the L-GW 102 or the HeNB 101 does not receive a LIPA resource release instruction from the MME 103 or the S-GW 104, or does not receive, from the UE 150, 151, any information indicating an end of communication with the terminal device 161 in the LAN 51, the L-GW 102 or the HeNB 101 determines whether or not the LIPA resource allocation should be maintained, and releases the LIPA resource.

[Operation]

Hereinafter, a case where establishment and release of a LIPA connection for the UE 151 are performed will be representatively described.

Firstly, a LIPA connection establishing process in the wireless communication system according to the embodiment of the present invention will be described.

Figure 2:
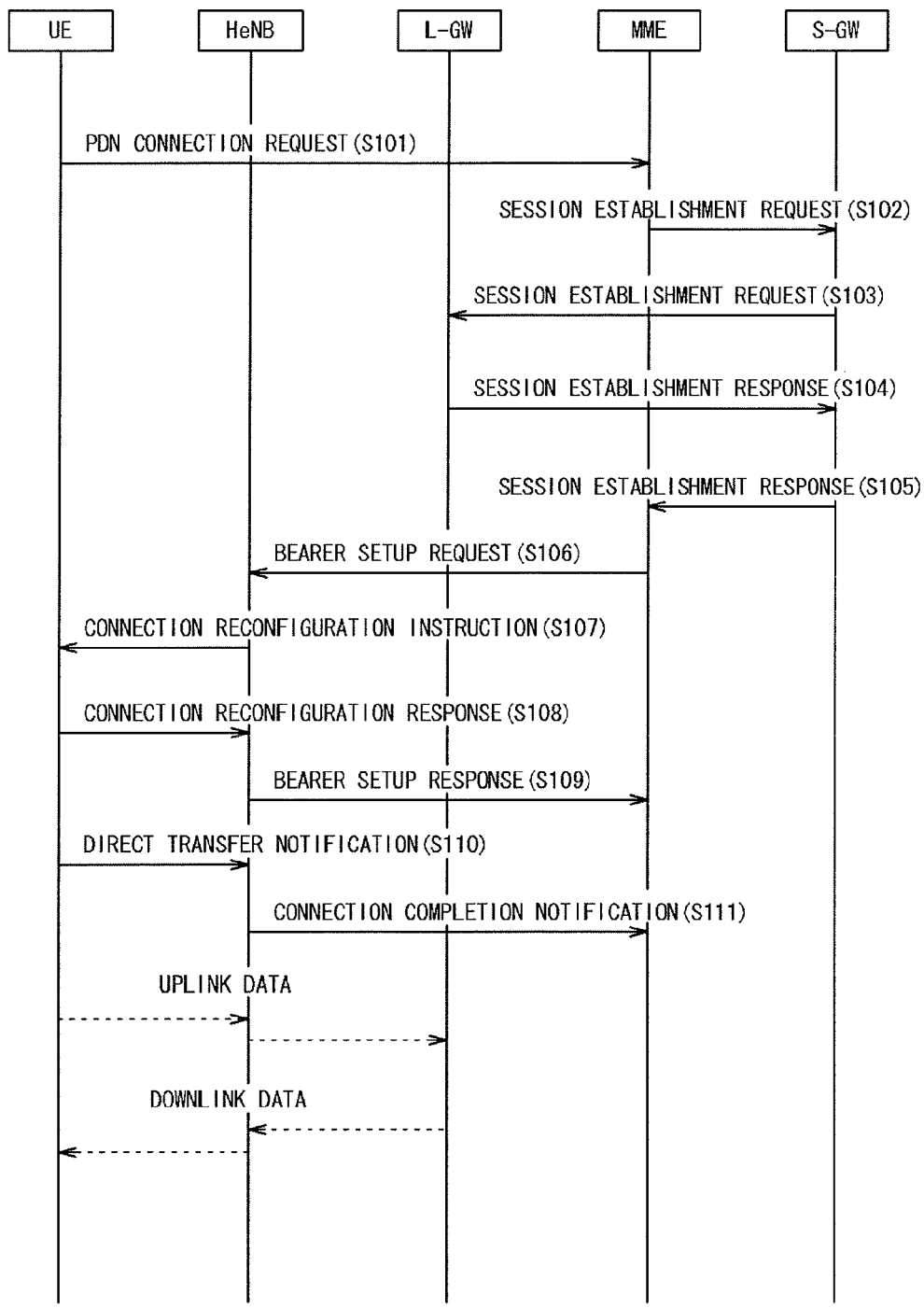
FIG. 2 is a diagram illustrating an example of a sequence for establishing a LIPA connection in the wireless communication system according to the embodiment of the present invention.

FIG. 2 is a diagram illustrating an example of a sequence for establishing a LIPA connection in the wireless communication system according to the embodiment of the present invention.

With reference to FIG. 2, firstly, the UE 151 transmits, to the MME 103, a PDN (Packet Data Network) connection request indicating an access request to the LAN 51 (step S101).

Upon receiving the PDN connection request from the UE 151, when the MME 103 determines that the LIPA is applicable, the MME 103 transmits, to the S-GW 104, a session establishment request indicating a request to allocate a resource such as a local IP address (step S102).

Next, the S-GW 104 transmits the session establishment request received from the MME 103, to the L-GW 102 (step S103).

Upon receiving the session establishment request from the S-GW 104, the L-GW 102 allocates a LIPA resource to the UE 151 if a predetermined number of UEs that can simultaneously access the LAN 51 would not be exceeded even with the UE 151 being added. For example, the L-GW 102 stores therein identification information of the UE 151 and the correspondence between the UE 151 and the local IP address, which are indicated by the session establishment request. Further, the L-GW 102 adds 1 to a resource usage count value indicating the number of UEs using the LIPA resource. Then, the L-GW 102 transmits a session establishment response including the local IP address for the UE 151, to the S-GW 104 (step S104).

Next, the S-GW 104 transmits the session establishment response received from the L-GW 102, to the MME 103 (step S105).

Upon receiving the session establishment response from the S-GW 104, the MME 103 transmits, to the HeNB 101, a bearer setup request including the IP address allocated by the L-GW 102, and the like (step S106). The bearer setup request is a request to establish a connection between a HeNB and a UE.

Upon receiving the bearer setup request from the MME 103, the HeNB 101 transmits an RRC connection reconfiguration instruction to the UE 151 (step S107).

Upon receiving the RRC connection reconfiguration instruction from the HeNB 101, the UE 151 transmits an RRC connection reconfiguration response to the HeNB 101 (step S108).

Upon receiving the RRC connection reconfiguration response from the UE 151, the HeNB 101 transmits a bearer setup response to the MME 103 (step S109).

Next, the UE 151 transmits, to the HeNB 101, a direct transfer notification indicating that the UE 151 accesses the LAN 51 by using the LIPA function (step S110).

Upon receiving the direct transfer notification from the UE 151, the HeNB 101 transmits a PDN connection completion notification to the MME 103 (step S111).

Thus, the LIPA connection is established, which enables an IP access to each equipment in the LAN 51 from the HeNB 101 directly via the L-GW 102. That is, an IP packet transmitted from the UE 151 is transferred to the terminal device 161 in the LAN 51 via the HeNB 101 and the L-GW 102, and an IP packet transmitted from the terminal device 161 is transferred to the UE 151 via the L-GW 102 and the HeNB 101.

After the establishment of the LIPA connection, data such as an IP packet with which the UE 151 accesses the LAN 51, need not be transmitted between the HeNB 101, and the MME 103 and the S-GW 104. Therefore, communication traffic between the HeNB 101, and the MME 103 and the S-GW 104 can be reduced.

In the wireless communication system 201, the HeNB 101 is connected to the S-GW 104 via the S1-U interface, while the eNB 106 is connected to the S-GW 105 via the S1-U interface. That is, the HeNB 101 and the eNB 106 have different S-GWs as host devices.

Therefore, after the establishment of the LIPA connection, if the UE 151 communicating with the terminal device 161 in the LAN 51 by using the LIPA function has performed handover from the HeNB 101 to the eNB 106, the S-GW 105 connected to the handover destination cannot instruct the L-GW 102 to release the LIPA resource of the UE 151. In this case, the L-GW 102 remains in the state where it allocates the LIPA resource that is not used, to the UE 151 that has performed handover and therefore is now out of the range of the HeNB 101.

So, in the wireless communication system according to the embodiment of the present invention, the above-mentioned problems are solved by performing LIPA resource release processes as follows.

In the wireless communication system according to the embodiment of the present invention, "handover" means that a wireless base station device that is a communication partner for a UE during phone call or data transmission is switched to another wireless base station device.

Figure 3:
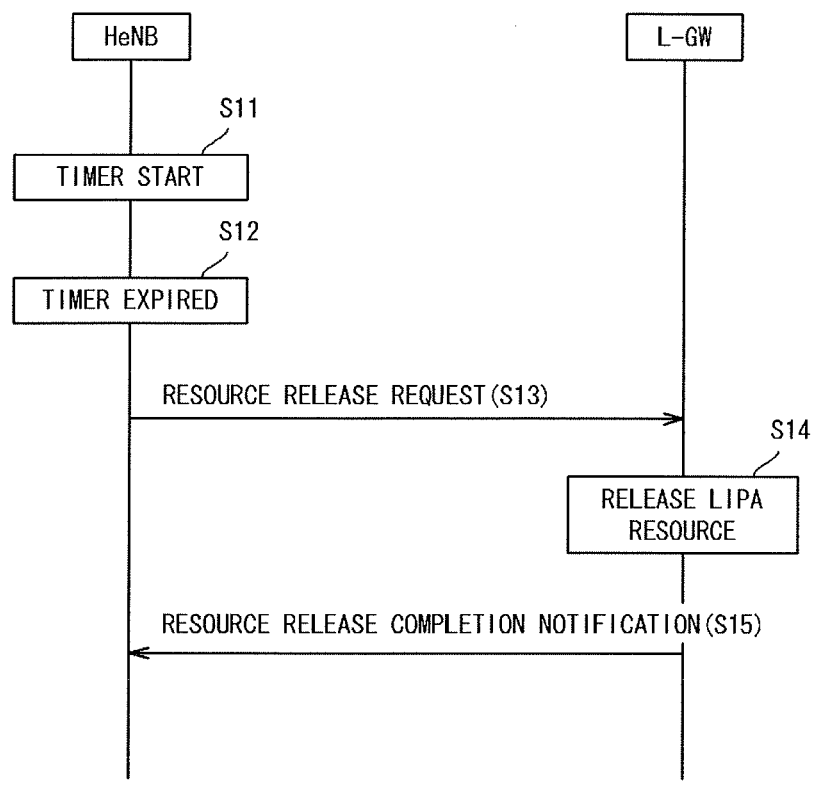
FIG. 3 is a diagram illustrating an example of a sequence of a LIPA resource release process in the wireless communication system according to the embodiment of the present invention.

FIG. 3 is a diagram illustrating an example of a sequence of a LIPA resource release process in the wireless communication system according to the embodiment of the present invention.

With reference to FIG. 3, if the communication between the UE 151 and the terminal device 161 in the LAN 51 via the L-GW 102 has not been performed for a predetermined time or more, the HeNB 101 determines that the allocation of the LIPA resource to the UE 151 should not be maintained.

More specifically, after the establishment of the LIPA connection of the UE 151, firstly, the HeNB 101 starts a timer. Timing to start the timer is, for example, timing at which the LIPA connection of the UE 151 is established, or timing at which the communication between the UE 151 and the terminal device 161 in the LAN 51 is interrupted. In addition, the HeNB 101 resets and restarts the timer, every time it detects that communication data such as an IP packet has been transmitted/received between the UE 151 and the terminal device 161 in the LAN 51 (step S11).

When the state where such communication data is not transmitted/received between the UE 151 and the terminal device 161 in the LAN 51 continues and then the timer expires (step S12), the HeNB 101 determines that the LIPA connection of the UE 151 should not be maintained, and transmits a resource release request to the L-GW 102 (step S13).

Upon receiving the resource release request from the HeNB 101, the L-GW 102 releases the LIPA resource. For example, the L-GW 102 deletes the identification information of the UE 151 and the information indicating the correspondence between the UE 151 and the local IP address, and subtracts 1 from the resource usage count value (step S14).

Next, the L-GW 102 transmits a resource release completion notification to the HeNB 101 (step S15).

Figure 4:
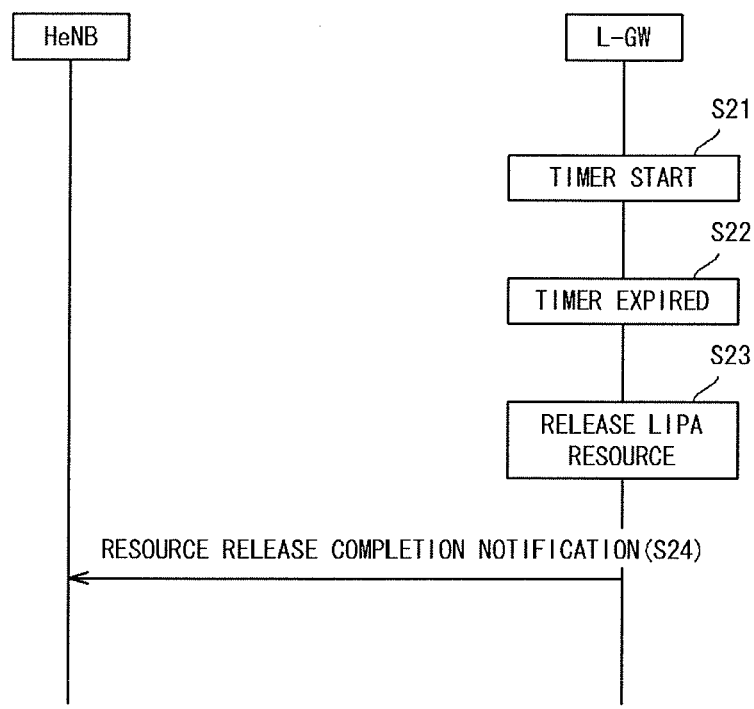
FIG. 4 is a diagram illustrating an example of a sequence of a LIPA resource release process in the wireless communication system according to the embodiment of the present invention.

FIG. 4 is a diagram illustrating an example of a sequence of a LIPA resource release process in the wireless communication system according to the embodiment of the present invention.

With reference to FIG. 4, if the communication between the UE 151 and the terminal device 161 in the LAN 51 via the L-GW 102 has not been performed for a predetermined time or more, the L-GW 102 determines that the allocation of the LIPA resource to the UE 151 should not be maintained.

More specifically, after the establishment of the LIPA connection of the UE 151, firstly, the L-GW 102 starts a timer. Timing to start the timer is, for example, timing at which the LIPA connection of the UE 151 is established, or timing at which the communication between the UE 151 and the terminal device 161 in the LAN 51 is interrupted. In addition, the L-GW 102 resets and restarts the timer, every time it detects that communication data such as an IP packet has been transmitted/received between the UE 151 and the terminal device 161 in the LAN 51 (step S21).

When the state where such communication data is not transmitted/received between the UE 151 and the terminal device 161 in the LAN 51 continues and then the timer expires (step S22), the L-GW 102 determines that the LIPA connection of the UE 151 should not be maintained, and releases the LIPA resource. For example, the L-GW 102 deletes the identification information of the UE 151 and the information indicating the correspondence between the UE 151 and the local IP address, and subtracts 1 from the resource usage count value (step S23).

Next, the L-GW 102 transmits a resource release completion notification to the HeNB 101 (step S24).

Figure 5:
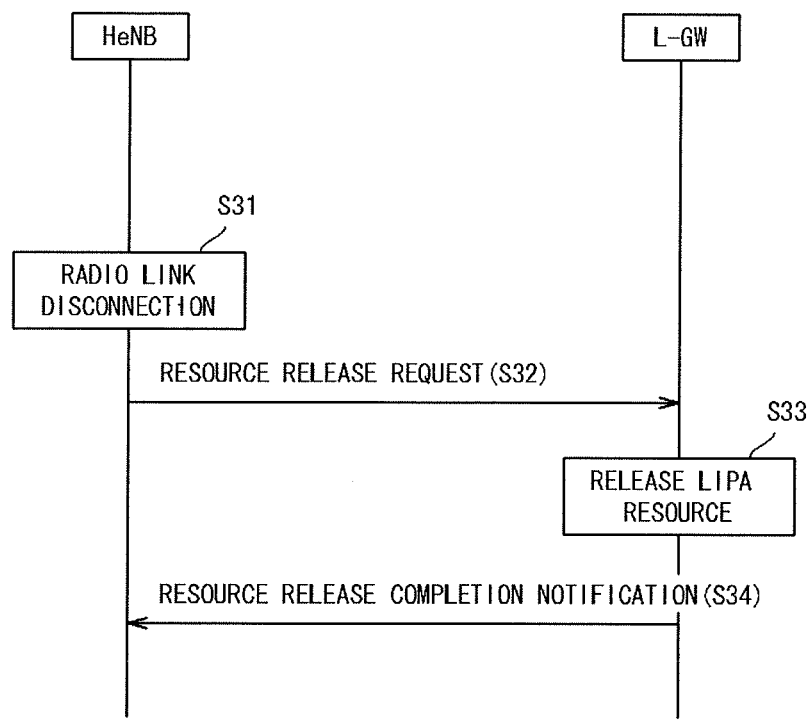
FIG. 5 is a diagram illustrating an example of a sequence of a LIPA resource release process in the wireless communication system according to the embodiment of the present invention.

FIG. 5 is a diagram illustrating an example of a sequence of a LIPA resource release process in the wireless communication system according to the embodiment of the present invention.

With reference to FIG. 5, if the UE 151 has become incommunicable with the HeNB 101, the HeNB 101 determines that the allocation of the LIPA resource to the UE 151 should not be maintained.

More specifically, after the establishment of the LIPA connection of the UE 151, firstly, the HeNB 101 starts to monitor the radio link between the HeNB 101 and the UE 151.

If disconnection of the radio link occurs (step S31), the HeNB 101 determines that the LIPA connection of the UE 151 should not be maintained, and transmits a resource release request to the L-GW 102 (step S32). For example, the HeNB 101 determines that the radio link is disconnected, when the HeNB 101 cannot receive the communication data that should have been periodically transmitted from the UE 151.

Upon receiving the resource release request from the HeNB 101, the L-GW 102 releases the LIPA resource. For example, the L-GW 102 deletes the identification information of the UE 151 and the information indicating the correspondence between the UE 151 and the local IP address, and subtracts 1 from the resource usage count value (step S33).

Next, the L-GW 102 transmits a resource release completion notification to the HeNB 101 (step S34).

The L-GW 102 or the HeNB 101 may be configured to determine that the allocation of the LIPA resource to the UE 151 should not be maintained, if the UE 151 is not communicable with the HeNB 101 and the communication between the UE 151 and the terminal device 161 in the LAN 51 via the L-GW 102 has not been performed for a predetermined time or more.

Figure 6:
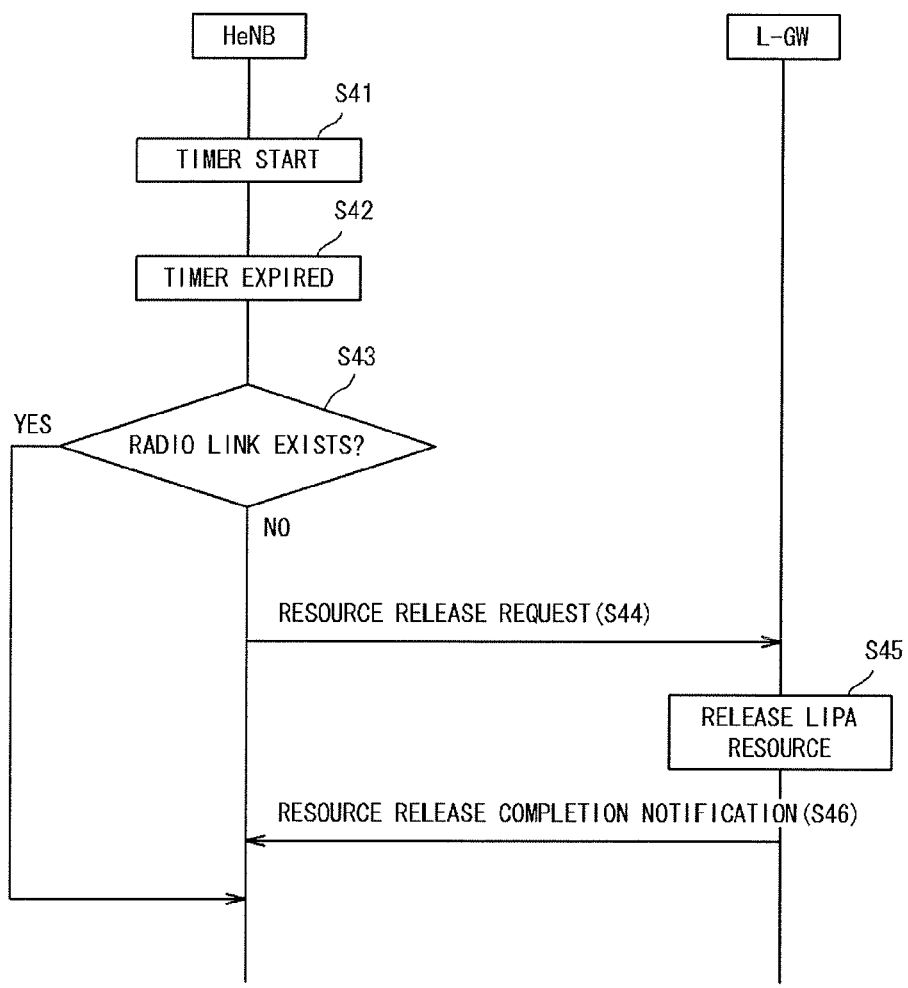
FIG. 6 is a diagram illustrating an example of a sequence of a LIPA resource release process in the wireless communication system according to the embodiment of the present invention.

FIG. 6 is a diagram illustrating an example of a sequence of a LIPA resource release process in the wireless communication system according to the embodiment of the present invention.

With reference to FIG. 6, in the state where the communication between the UE 151 and the terminal device 161 in the LAN 51 via the L-GW 102 has not been performed for a predetermined time or more, the HeNB 101 confirms whether or not the UE 151 is communicable with the HeNB 101. Upon determining that the UE 151 is not communicable with the HeNB 101, the HeNB 101 determines that the allocation of the LIPA resource to the UE 151 should not be maintained. Specifically, the HeNB 101 monitors the communication between the UE 151 and the terminal device 161 in the LAN 51 via the L-GW 102. When the communication has not been performed for the predetermined time or more, the HeNB 101 confirms whether or not the UE 151 is communicable with the HeNB 101.

More specifically, after the establishment of the LIPA connection of the UE 151, firstly, the HeNB 101 starts a timer (step S41).

When the state where communication data is not transmitted/received between the UE 151 and the terminal device 161 in the LAN 51 continues and then the timer expires (step S42), the HeNB 101 confirms whether or not there is a radio link between the HeNB 101 and the UE 151 (step S43).

When the radio link does not exist, that is, when the radio link is disconnected (NO in step S43), the HeNB 101 determines that the LIPA connection of the UE 151 should not be maintained, and transmits a resource release request to the L-GW 102 (step S44).

Upon receiving the resource release request from the HeNB 101, the L-GW 102 releases the LIPA resource. For example, the L-GW 102 deletes the identification information of the UE 151 and the information indicating the correspondence between the UE 151 and the local IP address, and subtracts 1 from the resource usage count value (step S45).

Next, the L-GW 102 transmits a resource release completion notification to the HeNB 101 (step S46).

On the other hand, when the radio link exists without being disconnected (YES in step S43), the HeNB 101 determines that the LIPA connection of the UE 151 should be maintained, and does not transmit a resource release request.

Figure 7:
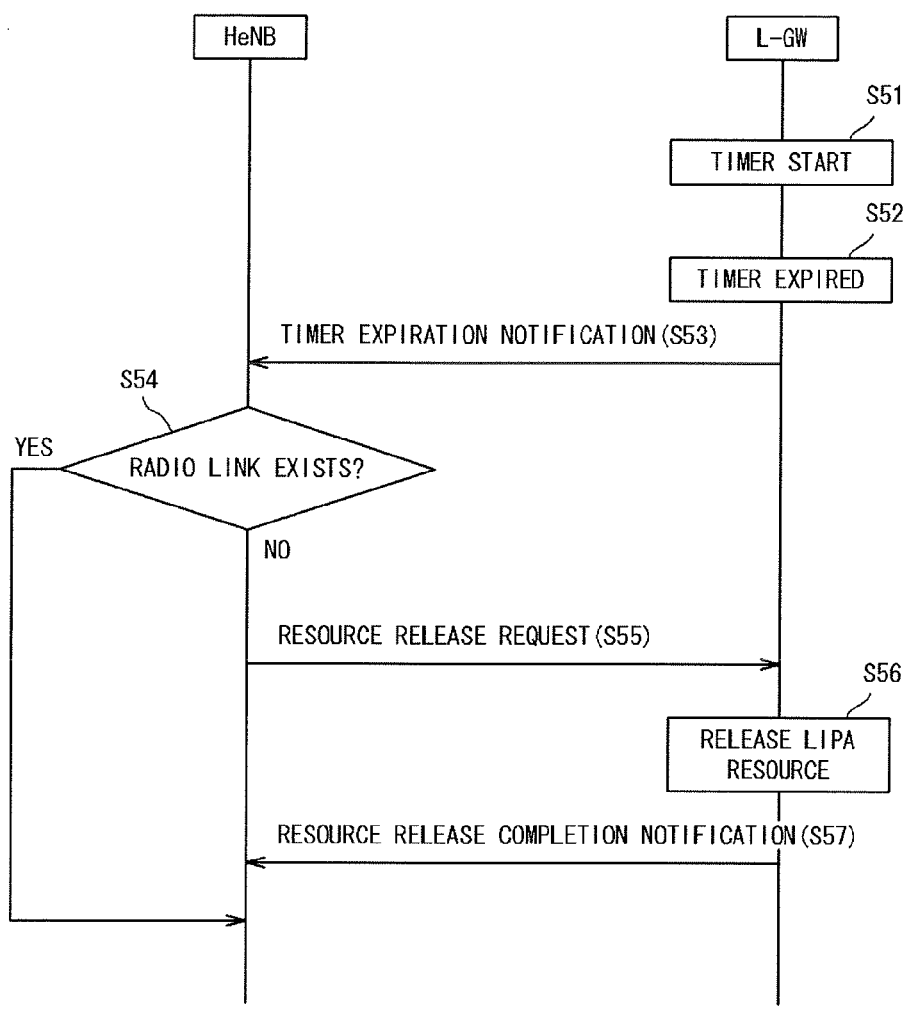
FIG. 7 is a diagram illustrating an example of a sequence of a LIPA resource release process in the wireless communication system according to the embodiment of the present invention.

FIG. 7 is a diagram illustrating an example of a sequence of a LIPA resource release process in the wireless communication system according to the embodiment of the present invention.

With reference to FIG. 7, in the state where the communication between the UE 151 and the terminal device 161 in the LAN 51 via the L-GW 102 has not been performed for a predetermined time or more, the HeNB 101 confirms whether or not the UE 151 is communicable with the HeNB 101. Upon determining that the UE 151 is not communicable with the HeNB 101, the HeNB 101 determines that the allocation of the LIPA resource to the UE 151 should not be maintained. Specifically, the L-GW 102 monitors the communication between the UE 151 and the terminal device 161 in the LAN 51 via the L-GW 102. If the communication has not been performed for the predetermined time or more, the L-GW 102 transmits idle communication information to the HeNB 101. Upon receiving the idle communication information, the HeNB 101 confirms whether or not the UE 151 is communicable with the HeNB 101.

More specifically, after the establishment of the LIPA connection of the UE 151, firstly, the L-GW 102 starts a timer (step S51).

When the state where communication data is not transmitted/received between the UE 151 and the terminal device 161 in the LAN 51 continues and then the timer expires (step S52), the L-GW 102 transmits a timer expiration notification (idle communication information) to the HeNB 101 (step S53).

Upon receiving the timer expiration notification from the L-GW 102, the HeNB 101 confirms whether or not there is a radio link between the HeNB 101 and the UE 151 (step S54).

When the radio link does not exist, that is, when the radio link is disconnected (NO in step S54), the HeNB 101 determines that the LIPA connection of the UE 151 should not be maintained, and transmits a resource release request to the L-GW 102 (step S55).

Upon receiving the resource release request from the HeNB 101, the L-GW 102 releases the LIPA resource. For example, the L-GW 102 deletes the identification information of the UE 151 and the information indicating the correspondence between the UE 151 and the local IP address, and subtracts 1 from the resource usage count value (step S56).

Next, the L-GW 102 transmits a resource release completion notification to the HeNB 101 (step S57).

On the other hand, when the radio link exists without being disconnected (YES in step S54), the HeNB 101 determines that the LIPA connection of the UE 151 should be maintained, and does not transmit a resource release request.

Figure 8:
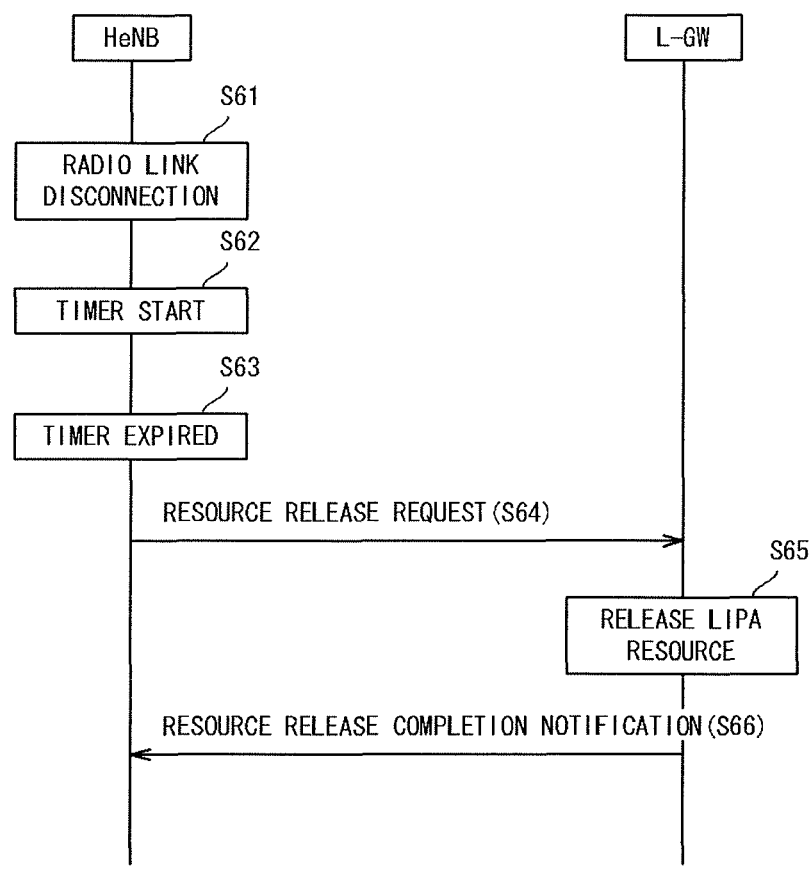
FIG. 8 is a diagram illustrating an example of a sequence of a LIPA resource release process in the wireless communication system according to the embodiment of the present invention.

FIG. 8 is a diagram illustrating an example of a sequence of a LIPA resource release process in the wireless communication system according to the embodiment of the present invention.

With reference to FIG. 8, if the communication between the UE 151 and the terminal device 161 in the LAN 51 via the L-GW 102 has not been performed for a predetermined time or more after the UE 151 became incommunicable with the HeNB 101, the HeNB 101 determines that the allocation of the LIPA resource to the UE 151 should not be maintained. Specifically, the HeNB 101 monitors whether or not the UE 151 is communicable with the HeNB 101. After the UE 151 has become incommunicable with the HeNB 101, the HeNB 101 monitors the communication between the UE 151 and the terminal device 161 in the LAN 51 via the L-GW 102.

More specifically, after the establishment of the LIPA connection of the UE 151, firstly, the HeNB 101 starts to monitor the radio link between the HeNB 101 and the UE 151.

When disconnection of the radio link occurs (step S61), the HeNB 101 starts a timer (step S62).

When the state where communication data is not transmitted/received between the UE 151 and the terminal device 161 in the LAN 51 or the state where the radio link is disconnected continues and then the timer expires (step S63), the HeNB 101 determines that the LIPA connection of the UE 151 should not be maintained, and transmits a resource release request to the L-GW 102 (step S64).

Upon receiving the resource release request from the HeNB 101, the L-GW 102 releases the LIPA resource. For example, the L-GW 102 deletes the identification information of the UE 151 and the information indicating the correspondence between the UE 151 and the local IP address, and subtracts 1 from the resource usage count value (step S65).

Next, the L-GW 102 transmits a resource release completion notification to the HeNB 101 (step S66).

Figure 9:
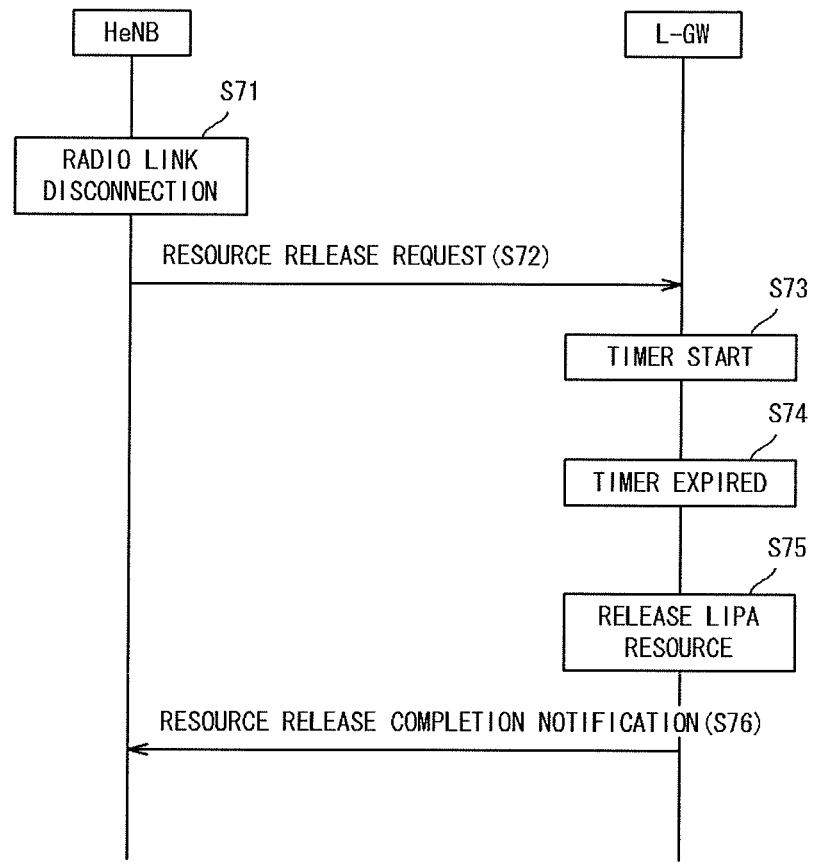
FIG. 9 is a diagram illustrating an example of a sequence of a LIPA resource release process in the wireless communication system according to the embodiment of the present invention.

FIG. 9 is a diagram illustrating an example of a sequence of a LIPA resource release process in the wireless communication system according to the embodiment of the present invention.

With reference to FIG. 9, if the communication between the UE 151 and the terminal device 161 in the LAN 51 via the L-GW 102 has not been performed for a predetermined time or more after the UE 151 became incommunicable with the HeNB 101, the L-GW 102 determines that the allocation of the LIPA resource to the UE 151 should not be maintained. Specifically, the HeNB 101 monitors whether or not the UE 151 is communicable with the HeNB 101. When the UE 151 has become incommunicable with the HeNB 101, the HeNB 101 transmits a radio link disconnection information to the L-GW 102. Upon receiving the radio link disconnection information, the L-GW 102 monitors the communication between the UE 151 and the terminal device 161 in the LAN 51 via the L-GW 102.

More specifically, after the establishment of the LIPA connection of the UE 151, firstly, the HeNB 101 starts to monitor the radio link between the HeNB 101 and the UE 151.

When disconnection of the radio link occurs (step S71), the HeNB 101 transmits a resource release request (radio link disconnection information) to the L-GW 102 (step S72).

Upon receiving the resource release request from the HeNB 101, the L-GW 102 starts a timer (step S73).

When the state where communication data is not transmitted/received between the UE 151 and the terminal device 161 in the LAN 51 or the state where the radio link is disconnected continues and then the timer expires (step S74), the L-GW 102 determines that the LIPA connection of the UE 151 should not be maintained, and releases the LIPA resource. For example, the L-GW 102 deletes the identification information of the UE 151 and the info illation indicating the correspondence between the UE 151 and the local IP address, and subtracts 1 from the resource usage count value (step S75).

Next, the L-GW 102 transmits a resource release completion notification to the HeNB 101 (step S76).

The wireless communication system 201 may be configured to perform a resource release process under the following conditions.

Figure 10:
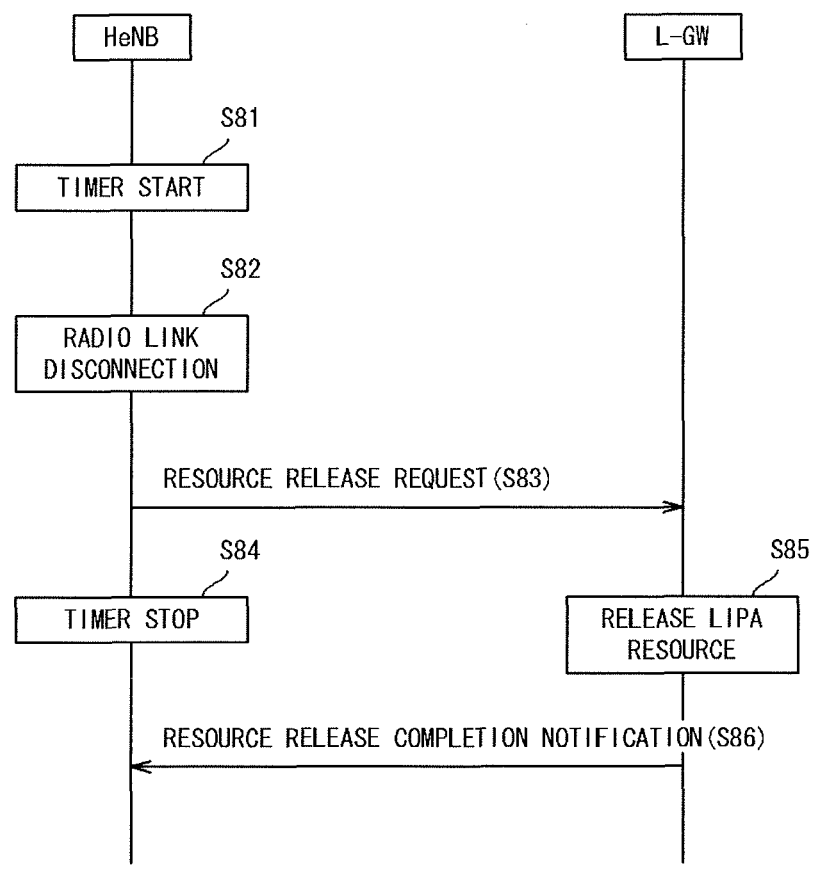
FIG. 10 is a diagram illustrating an example of a sequence of a LIPA resource release process in the wireless communication system according to the embodiment of the present invention.

FIG. 10 is a diagram illustrating an example of a sequence of a LIPA resource release process in the wireless communication system according to the embodiment of the present invention.

With reference to FIG. 10, when a predetermined time has elapsed from when the communication between the UE 151 and the terminal device 161 in the LAN 51 via the L-GW 102 became not to be performed, the HeNB 101 determines that the allocation of the LIPA resource to the UE 151 should not be maintained. Then, when the UE 151 has become incommunicable with the HeNB 101, even if the predetermined time has not elapsed from when the communication became not to be performed, the HeNB 101 determines that the allocation of the LIPA resource to the UE 151 should not be maintained. Specifically, the HeNB 101 monitors the communication between the UE 151 and the terminal device 161 in the LAN 51 via the L-GW 102, and monitors whether or not the UE 151 is communicable with the HeNB 101.

More specifically, after the establishment of the LIPA connection of the UE 151, firstly, the HeNB 101 starts a timer. Timing to start the timer is, for example, timing at which the LIPA connection of the UE 151 is established, or timing at which the communication between the UE 151 and the terminal device 161 in the LAN 51 is interrupted. In addition, the HeNB 101 resets and restarts the timer, every time it detects that communication data such as an IP packet has been transmitted/received between the UE 151 and the terminal device 161 in the LAN 51 (step S81).

In parallel with the above process, the HeNB 101 starts to monitor the radio link between the HeNB 101 and the UE 151.

If disconnection of the radio link occurs in the state where the timer has not expired yet (step S82), the HeNB 101 determines that the LIPA connection of the UE 151 should not be maintained, and transmits a resource release request to the L-GW 102 (step S83), and then stops the timer (step S84).

Upon receiving the resource release request from the HeNB 101, the L-GW 102 releases the LIPA resource. For example, the L-GW 102 deletes the identification information of the UE 151 and the information indicating the correspondence between the UE 151 and the local IP address, and subtracts 1 from the resource usage count value (step S85).

Next, the L-GW 102 transmits a resource release completion notification to the HeNB 101 (step S86).

On the other hand, in the state where the radio link is not disconnected, when the state where communication data is not transmitted/received between the UE 151 and the terminal device 161 in the LAN 51 continues and then the timer expires, the HeNB 101 determines that the LIPA connection of the UE 151 should not be maintained, and transmits a resource release request to the L-GW 102, like in steps S12 and S13 shown in FIG. 3.

Figure 11:
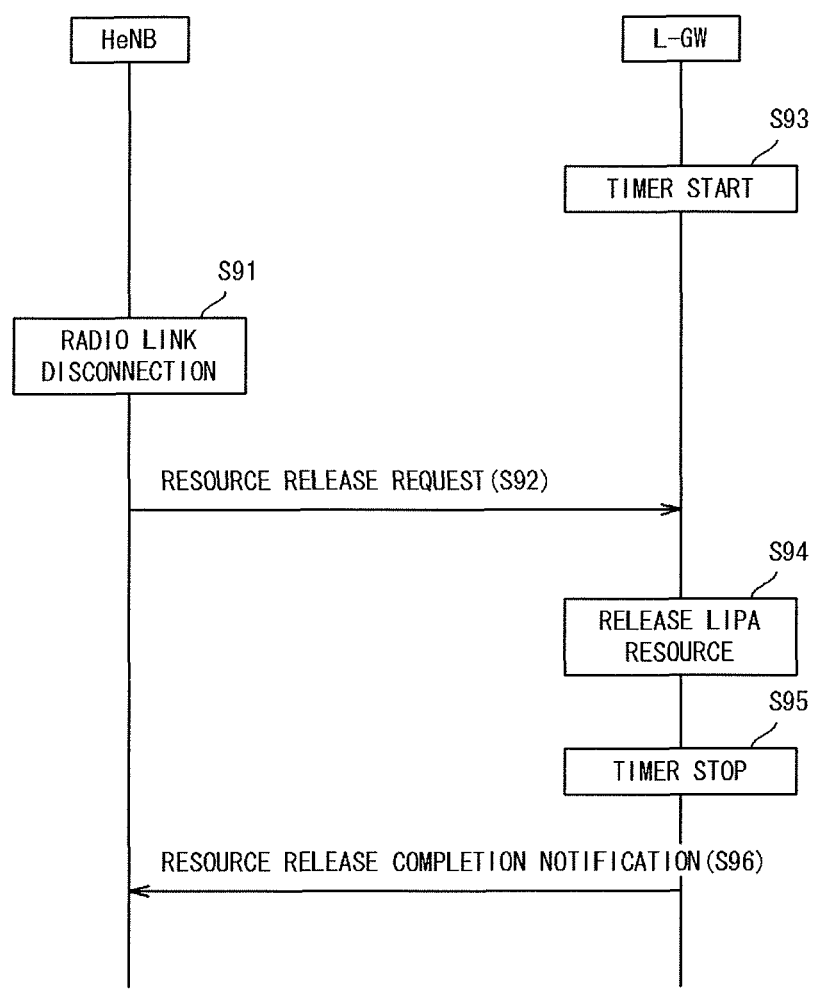
FIG. 11 is a diagram illustrating an example of a sequence of a LIPA resource release process in the wireless communication system according to the embodiment of the present invention.

FIG. 11 is a diagram illustrating an example of a sequence of a LIPA resource release process in the wireless communication system according to the embodiment of the present invention.

With reference to FIG. 11, when a predetermined time has elapsed from when the communication between the UE 151 and the terminal device 161 in the LAN 51 via the L-GW 102 became not to be performed, the L-GW 102 determines that the allocation of the LIPA resource to the UE 151 should not be maintained. Then, when the UE 151 has become incommunicable with the HeNB 101, even if the predetermined time has not elapsed from when the communication became not to be performed, the HeNB 101 determines that the allocation of the LIPA resource to the UE 151 should not be maintained. Specifically, the L-GW 102 monitors the communication between the UE 151 and the terminal device 161 in the LAN 51 via the L-GW 102. In addition, the HeNB 101 monitors whether or not the UE 151 is communicable with the HeNB 101.

More specifically, after the establishment of the LIPA connection of the UE 151, firstly, the L-GW 102 starts a timer. Timing to start the timer is, for example, timing at which the LIPA connection of the UE 151 is established, or timing at which the communication between the UE 151 and the terminal device 161 in the LAN 51 is interrupted. In addition, the L-GW 102 resets and restarts the timer, every time it detects that communication data such as an IP packet has been transmitted/received between the UE 151 and the terminal device 161 in the LAN 51 (step S93).

In parallel with the above process, the HeNB 101 starts to monitor the radio link between the HeNB 101 and the UE 151.

If disconnection of the radio link occurs in the state where the timer of the L-GW 102 has not expired yet (step S91), the HeNB 101 determines that the LIPA connection of the UE 151 should not be maintained, and transmits a resource release request to the L-GW 102 (step S92).

Upon receiving the resource release request from the HeNB 101, the L-GW 102 releases the LIPA resource. For example, the L-GW 102 deletes the identification information of the UE 151 and the information indicating the correspondence between the UE 151 and the local IP address, and subtracts 1 from the resource usage count value (step S94).

Next, the L-GW 102 stops the timer (step S95), and transmits a resource release completion notification to the HeNB 101 (step S96).

On the other hand, in the state where the radio link is not disconnected, when the state where communication data is not transmitted/received between the UE 151 and the terminal device 161 in the LAN 51 continues and then the timer expires, the L-GW 102 determines that the LIPA connection of the UE 151 should not be maintained, and releases the LIPA resource, like in steps S22 and S23 shown in FIG. 4.

The wireless communication system 201 may be configured to perform a LIPA resource release process at the following timings.

Figure 12:
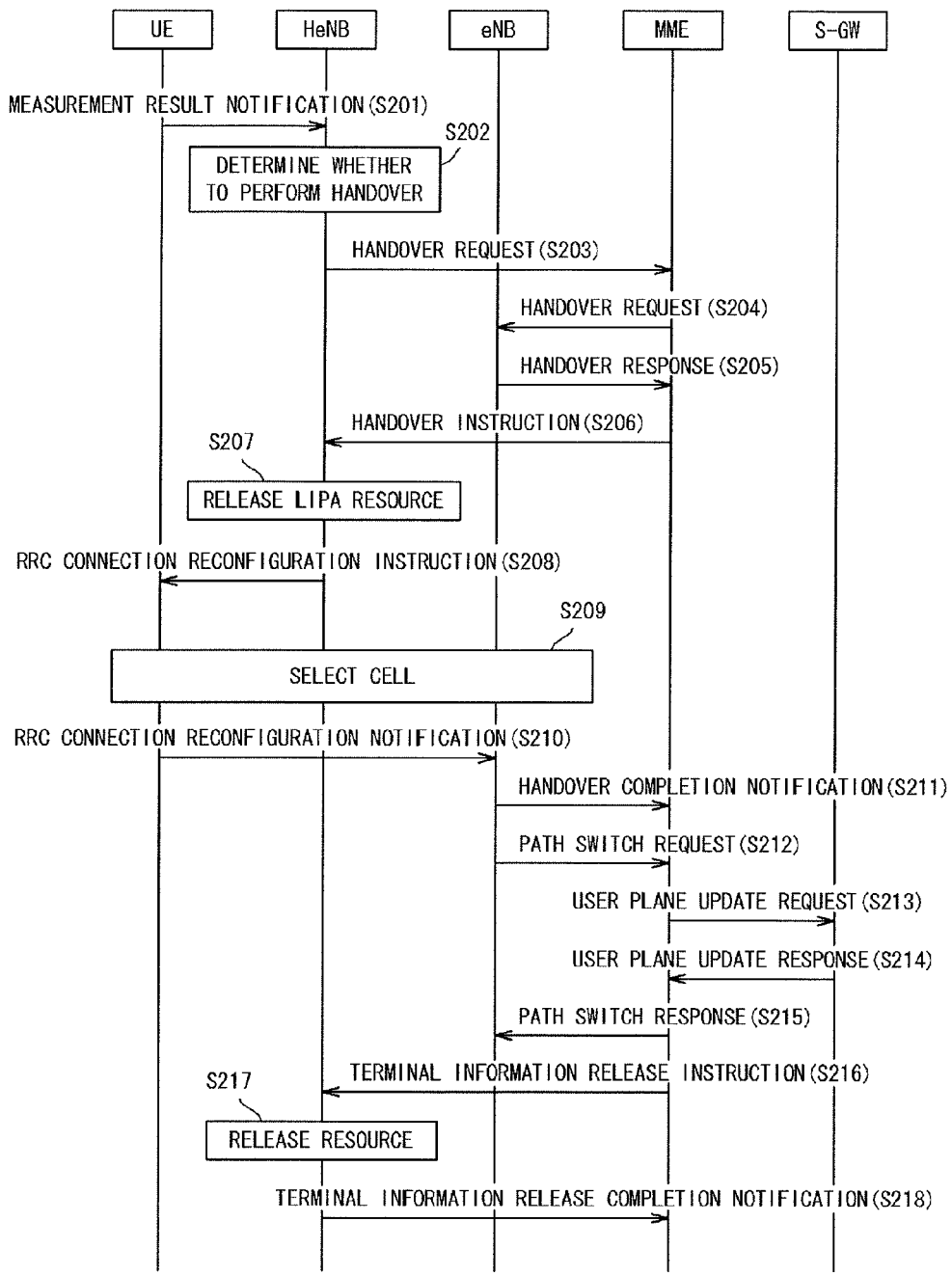
FIG. 12 is a diagram illustrating an example of a sequence of a handover operation in the wireless communication system according to the embodiment of the present invention.

FIG. 12 is a diagram illustrating an example of a sequence of a handover operation in the wireless communication system according to the embodiment of the present invention.

With reference to FIG. 12, when the UE 151 performs handover to another wireless base station device, the HeNB 101 transmits, to the L-GW 102, a resource release request indicating a request to cancel the allocation of the LIPA resource to the UE 151, in advance of or in parallel with transmitting, to the UE 151, a handover instruction indicating an instruction that causes the UE 151 to perform handover. Upon receiving the resource release request, the L-GW 102 cancels the allocation of the LIPA resource to the UE 151.

More specifically, firstly, the UE 151 communicating with the HeNB 101 measures the reception levels of radio signals transmitted from other wireless base station devices than the HeNB 101 in the wireless communication system 201, and transmits a measurement result notification indicating the measurement result to the HeNB 101. For example, the UE 151 periodically performs the measurement of the reception levels. When the communication state with the HeNB 101 is deteriorated or when the communication state with another wireless base station device than the HeNB 101 is improved, the UE 151 transmits the measurement result notification to the HeNB 101 (step S201).

Next, based on the measurement result notification received from the UE 151, the HeNB 101 determines whether or not the UE 151 should perform handover (step S202). Upon determining that the UE 151 should perform handover, the HeNB 101 determines, for example, the eNB 106 as a handover destination, and transmits a handover request indicating the eNB 106 to the MME 103 (step S203).

In the wireless communication system according to the embodiment of the present invention, "handover" means that a wireless base station device which is a communication partner for a UE during phone call or data transmission is switched to another wireless base station device.

Upon receiving the handover request from the HeNB 101, the MME 103 transmits the handover request to the eNB 106 (step S204).

Upon receiving the handover request from the MME 103, the eNB 106 transmits a handover response to the handover request, to the MME 103 (step S205).

Upon receiving the handover response from the eNB 106, the MME 103 transmits a handover instruction to the HeNB 101 (step S206).

Upon receiving the handover instruction from the MME 103, the HeNB 101 determines that the LIPA connection of the UE 151 should not be maintained, and transmits a resource release request to the L-GW 102. Upon receiving the resource release request from the HeNB 101, the L-GW 102 releases the LIPA resource (step S207).

Next, the HeNB 101 transmits, to the UE 151, an RRC (Radio Resource Control) connection reconfiguration instruction including an instruction that causes the UE 151 to perform handover (step S208).

Upon receiving the RRC connection reconfiguration instruction from the HeNB 101, the UE 151 performs a cell selection process, that is, transmission/reception of various kinds of communication data to/from the eNB 106 in order to establish an RRC connection with the eNB 106 (step S209). The RRC connection is a connection used by a UE to communicate with a wireless base station device.

When the RRC connection has been established between the UE 151 and the eNB 106, the UE 151 transmits an RRC connection reconfiguration notification to the eNB 106 (step S210).

Upon receiving the RRC connection establishment notification from the UE 151, the eNB 106 transmits a handover completion notification to the MME 103 (step S211).

Next, the eNB 106 transmits a path switch request to the MME 103 (step S212).

Next, the MME 103 transmits a user plane update request to the S-GW 104, 105 (step S213).

Next, the S-GW 104, 105 transmits a user plane update response to the MME 103 (step S214).

Next, the MME 103 transmits a path switch response to the eNB 106 (step S215).

Upon receiving the handover completion notification from the eNB 106, the MME 103 transmits a terminal information release instruction to the HeNB 101 (step S216).

Upon receiving the terminal information release instruction from the MME 103, the HeNB 101 releases the resource relating to the UE 151 (step S217), and transmits a terminal information release completion notification to the MME 103 (step S218).

Further, the wireless communication system 201 may be configured to perform, regarding handover, a LIPA resource release process according to a method as follows.

Figure 13:
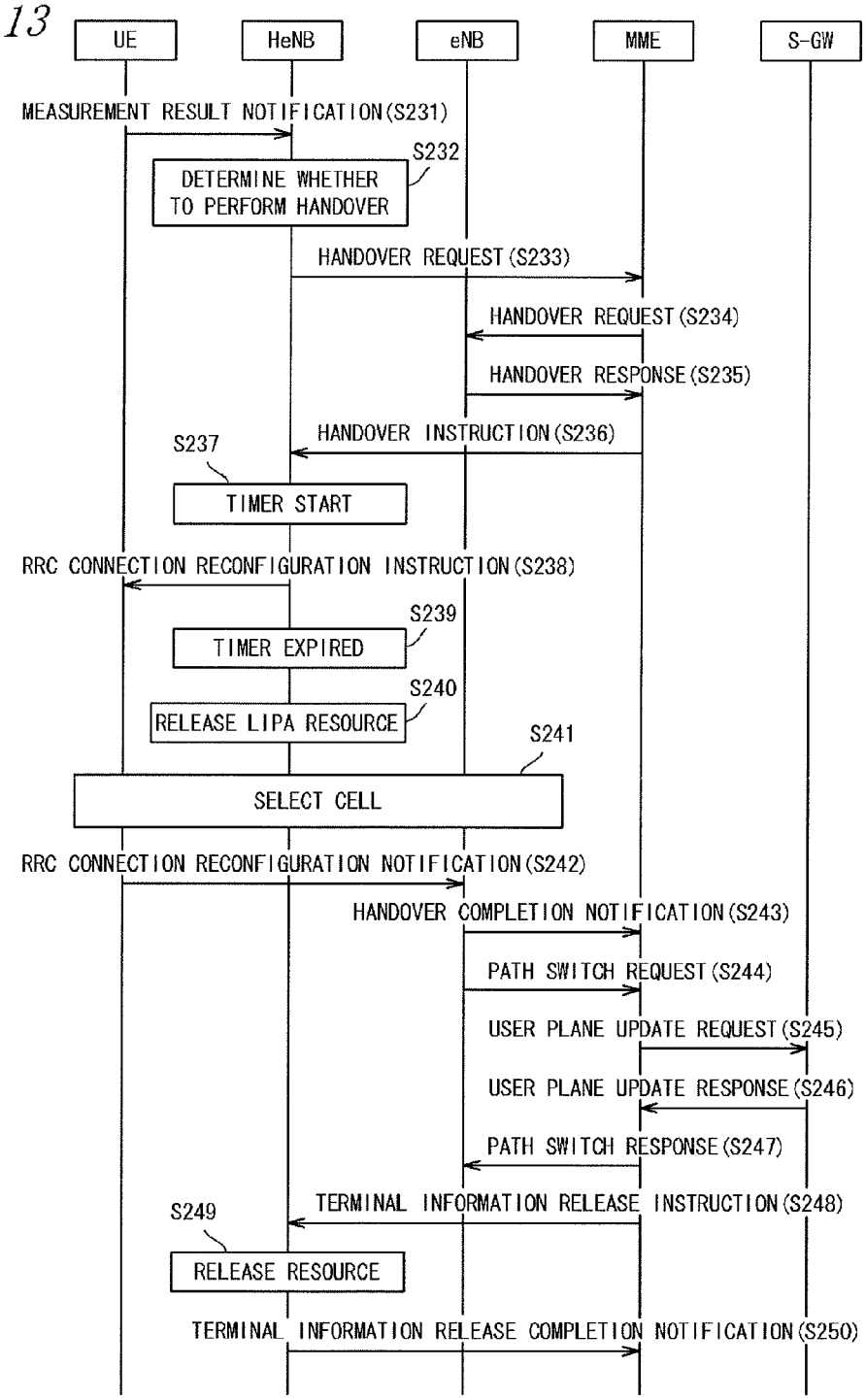
FIG. 13 is a diagram illustrating an example of a sequence of a handover operation in the wireless communication system according to the embodiment of the present invention.

FIG. 13 is a diagram illustrating an example of a sequence of a handover operation in the wireless communication system according to the embodiment of the present invention.

With reference to FIG. 13, when the UE 151 performs handover to another wireless base station device, if the communication between the UE 151 and the terminal device 161 in the LAN 51 via the L-GW 102 has not been performed for a predetermined time or more after the HeNB 101 transmitted, to the UE 151, a handover instruction indicating an instruction that causes the UE 151 to perform handover, the HeNB 101 transmits, to the L-GW 102, a resource release request indicating a request to cancel the allocation of the LIPA resource to the UE 151. Upon receiving the resource release request, the L-GW 102 cancels the allocation of the LIPA resource to the UE 151.

More specifically, firstly, the operations in steps S231 to S236 are identical to the operations in steps S201 to S206 in the sequence shown in FIG. 12, respectively.

Upon receiving the handover instruction from the MME 103, the HeNB 101 starts a timer. The HeNB 101 resets and restarts the timer, every time it detects that communication data such as an IP packet has been transmitted/received between the UE 151 and the terminal device 161 in the LAN 51 (step S237).

Next, the HeNB 101 transmits, to the UE 151, an RRC connection reconfiguration instruction including an instruction that causes the UE 151 to perform handover (step S238).

When the state where communication data is not transmitted/received between the UE 151 and the terminal device 161 in the LAN 51 continues and then the timer expires (step S239), the HeNB 101 determines that the LIPA connection of the UE 151 should not be maintained, and transmits a resource release request to the L-GW 102. Upon receiving the resource release request from the HeNB 101, the L-GW 102 releases the LIPA resource (step S240).

The operations in subsequent steps S241 to S250 are identical to the operations in steps S209 to S218 in the sequence shown in FIG. 12, respectively, and are performed regardless of whether or not the timer expires.

After the HeNB 101 has transmitted the RRC connection reconfiguration instruction to the UE 151, if a failure of handover occurs in the cell selection process (step S209), the UE 151 again performs a process of establishing an RRC connection with the HeNB 101.

In the sequence shown in FIG. 13, in contrast to the sequence shown in FIG. 12, a grace period is provided between the transmission of the RRC connection reconfiguration instruction and the transmission of the resource release request to the L-GW 102. Thereby, even when a failure of handover occurs, the UE 151 need not perform the LIPA connection establishment process again, thereby enhancing the efficiency of the process in the communication system.

In the sequence shown in FIG. 13, the timer is started before the transmission of the RRC connection reconfiguration instruction. However, the present invention is not limited thereto. The timer may be started simultaneously with or after the transmission of the RRC connection reconfiguration instruction.

By the way, when a UE communicating with a terminal device in the LAN by using the LIPA resource has performed handover from a HeNB to a eNB, the eNB as a handover destination transmits a notification about the handover of the UE to the L-GW via, for example, the MME, and then the L-GW needs to release the LIPA resource allocated to the UE.

However, depending on the configuration of the mobile communication system, there are cases where such a notification from the MME to the L-GW cannot be performed. In these cases, the L-GW remains in the state where it allocates, to the UE, the LIPA resource that is not used.

In contrast, in the wireless communication system according to the embodiment of the present invention, the L-GW 102 or the HeNB 101 determines whether or not the allocation of the LIPA resource to the UE should be maintained. Upon receiving a determination that the allocation of the LIPA resource should not be maintained, the L-GW 102 cancels the allocation of the LIPA resource.

According to this configuration, the determination whether to release the LIPA resource and the process of releasing the LIPA resource can be performed on the internal network side, that is, in the HeNB 101 or the L-GW 102. Therefore, it is possible to autonomously release the LIPA resource on the internal network side without receiving a notification from the MME. Accordingly, in the wireless communication system according to the embodiment of the present invention, it is possible to appropriately manage a resource which is used by a wireless terminal device to communicate with a terminal device in the internal network.

Further, in the wireless communication system according to the embodiment of the present invention, when the communication between the UE 151 and the terminal device 161 in the LAN 51 via the L-GW 102 has not been performed for a predetermined time or more, the L-GW 102 or the HeNB 101 determines that the allocation of the LIPA resource to the UE 151 should not be maintained.

According to this configuration, the LIPA resource that has not been used for a certain period can be appropriately released.

Further, in the wireless communication system according to the embodiment of the present invention, when the UE 151 has become incommunicable with the HeNB 101, the HeNB 101 determines that the allocation of the LIPA resource to the UE 151 should not be maintained.

According to this configuration, for example, the LIPA resource, which has been used by the UE that has moved out of the range of the HeNB 101, can be appropriately released.

Further, in the wireless communication system according to the embodiment of the present invention, when the UE 151 is not communicable with the HeNB 101 and the communication between the UE 151 and the terminal device 161 in the LAN 51 via the L-GW 102 has not been performed for a predetermined time or more, the L-GW 102 or the HeNB 101 determines that the allocation of the LIPA resource to the UE 151 should not be maintained.

As described above, since the LIPA resource is released on condition both that the LIPA resource has not been used for a certain period and that the UE has become incommunicable with the wireless base station device, it is possible to appropriately release the LIPA resource.

Further, in the wireless communication system according to the embodiment of the present invention, in the state where the communication between the UE 151 and the terminal device 161 in the LAN 51 via the L-GW 102 has not been performed for a predetermined time or more, the HeNB 101 confirms whether or not the UE 151 is communicable with the HeNB 101, and when the UE 151 is not communicable with the HeNB 101, the HeNB 101 determines that the allocation of the LIPA resource to the UE 151 should not be maintained.

According to this configuration, when the UE, which no longer accesses the terminal device 161 in the LAN 51 but exists in the range of the HeNB 101, resumes the access, the UE need not execute the LIPA connection establishment process again, thereby enhancing the efficiency of the process in the communication system.

Further, in the wireless communication system according to the embodiment of the present invention, the HeNB 101 monitors the communication between the UE 151 and the terminal device 161 in the LAN 51 via the L-GW 102, and when the communication has not been performed for a predetermined time or more, the HeNB 101 confirms whether or not the UE 151 is communicable with the HeNB 101.

According to this configuration, the L-GW 102 need not transmit a timer expiration notification (idle communication information) to the HeNB 101, thereby enhancing the efficiency of the process in the communication system.

Further, in the wireless communication system according to the embodiment of the present invention, the L-GW 102 monitors the communication between the UE 151 and the terminal device 161 in the LAN 51 via the L-GW 102, and when the communication has not been performed for a predetermined time or more, the L-GW 102 transmits idle communication information to the HeNB 101. Upon receiving the idle communication information, the HeNB 101 confirms whether or not the UE 151 is communicable with the HeNB 101.

According to this configuration, the HeNB 101 side need not have the function of monitoring the communication between the UE 151 and the terminal device 161 in the LAN 51 via the L-GW 102, thereby achieving load balancing between the HeNB 101 and the L-GW 102.

Further, in the wireless communication system according to the embodiment of the present invention, when the communication between the UE 151 and the terminal device 161 in the LAN 51 via the L-GW 102 has not been performed for a predetermined time or more after the UE 151 became incommunicable with the HeNB 101, the L-GW 102 or the HeNB 101 determines that the allocation of the LIPA resource to the UE 151 should not be maintained.

According to this configuration, when the UE, which has moved out of the range of the HeNB 101, again enters the range of the HeNB 101 in a short time, the UE need not execute the LIPA connection establishment process again, thereby enhancing the efficiency of the process in the communication system.

Further, in the wireless communication system according to the embodiment of the present invention, the HeNB 101 monitors whether or not the UE 151 is communicable with the HeNB 101. After the UE 151 has become incommunicable with the HeNB 101, the HeNB 101 monitors the communication between the UE 151 and the terminal device 161 in the LAN 51 via the L-GW 102.

According to this configuration, the L-GW 102 need not have the function of monitoring the communication between the UE 151 and the terminal device 161 in the LAN 51 via the L-GW 102, thereby achieving load balancing between the HeNB 101 and the L-GW 102.

Further, in the wireless communication system according to the embodiment of the present invention, the HeNB 101 monitors whether or not the UE 151 is communicable with the HeNB 101, and when the UE 151 has become incommunicable with the HeNB 101, the HeNB 101 transmits the radio link disconnection information to the L-GW 102. Upon receiving the radio link disconnection information, the L-GW 102 monitors the communication between the UE 151 and the terminal device 161 in the LAN 51 via the L-GW 102.

According to this configuration, the HeNB 101 need not have the function of monitoring the communication between the UE 151 and the terminal device 161 in the LAN 51 via the L-GW 102, thereby achieving load balancing between the HeNB 101 and the L-GW 102.

Further, in the wireless communication system according to the embodiment of the present invention, when a predetermined time has elapsed from when the communication between the UE 151 and the terminal device 161 in the LAN 51 via the L-GW 102 became not to be performed, the L-GW 102 or the HeNB 101 determines that the allocation of the LIPA resource to the UE 151 should not be maintained. Then, when the UE 151 has become incommunicable with the HeNB 101, the HeNB 101 determines that the allocation of the LIPA resource to the UE 151 should not be maintained, even if the above-mentioned predetermined time has not elapsed yet from when the communication became not to be performed.

According to this configuration, for example, the LIPA resource, which has been used by the UE that has moved out of the range of the HeNB 101, can be promptly released.

Further, in the wireless communication system according to the embodiment of the present invention, the HeNB 101 monitors the communication between the UE 151 and the terminal device 161 in the LAN 51 via the L-GW 102, and monitors whether or not the UE 151 is communicable with the HeNB 101.

According to this configuration, the L-GW 102 need not have the function of monitoring the communication between the UE 151 and the terminal device 161 in the LAN 51 via the L-GW 102, thereby achieving load balancing between the HeNB 101 and the L-GW 102.

Further, in the wireless communication system according to the embodiment of the present invention, the L-GW 102 monitors the communication between the UE 151 and the terminal device 161 in the LAN 51 via the L-GW 102. The HeNB 101 monitors whether or not the UE 151 is communicable with the HeNB 101.

According to this configuration, the HeNB 101 need not have the function of monitoring the communication between the UE 151 and the terminal device 161 in the LAN 51 via the L-GW 102, thereby achieving load balancing between the HeNB 101 and the L-GW 102.

Further, in the wireless communication system according to the embodiment of the present invention, when the UE 151 performs handover to another HeNB 101, the HeNB 101 transmits, to the L-GW 102, a resource release request indicating a request to cancel the allocation of the LIPA resource to the UE 151, in advance of or in parallel with transmitting, to the UE 151, a handover instruction indicating an instruction that causes the UE 151 to perform handover. Upon receiving the resource release request, the L-GW 102 cancels the allocation of the LIPA.

According to this configuration, even if there is no notification from the handover destination, such as when a terminal information release instruction from the MME 103 does not arrive, it is possible to reliably release the LIPA resource.

Further, in the wireless communication system according to the embodiment of the present invention, when the UE 151 performs handover to another wireless base station device, if the communication between the UE 151 and the terminal device 161 in the LAN 51 via the L-GW 102 has not been performed for a predetermined time or more after the HeNB 101 transmitted, to the UE 151, a handover instruction indicating an instruction that causes the UE 151 to perform handover, the HeNB 101 transmits, to the L-GW 102, a resource release request indicating a request to cancel the allocation of the LIPA resource to the UE 151. Upon receiving the resource release request, the L-GW 102 cancels the allocation of the LIPA resource.

According to this configuration, even if there is no notification from the handover destination, such as when a terminal information release instruction from the MME 103 does not arrive, it is possible to reliably release the LIPA resource. In addition, even when a failure of handover occurs, the LIPA connection establishment process need not be executed again, thereby enhancing the efficiency of the process in the communication system.

Further, in the wireless communication system according to the embodiment of the present invention, the wireless communication system 201 includes a plurality of (for example, two) wireless base station devices, i.e., the HeNB 101 and the eNB 106, and a plurality of (for example, two) S-GWs. Of the wireless base station devices, at least two wireless base station devices, for example, the HeNB 101 and the eNB 106, are connected to the different S-GWs, respectively.

In this wireless communication system, when the UE has performed handover, it is difficult to receive a notification as an instruction to release the LIPA resource, from the MME. Therefore, more remarkable effect can be achieved by transmitting the resource release request to the L-GW 102 in advance of or in parallel with transmitting the handover instruction to the UE.

Further, the wireless communication system according to the embodiment of the present invention includes the HeNBs defined in the 3GPP, the L-GWs defined in the 3GPP, and the S-GWs defined in the 3GPP.

According to this configuration, it is possible to appropriately manage a resource which is used by a wireless terminal device to communicate with a terminal device in an internal network, by using the LIPA function defined in the 3GPP.

In the wireless communication system according to the embodiment of the present invention, the operation of appropriately releasing the LIPA resource when the UE performs handover to another wireless base station device, has been described. However, the present invention is not limited to such a case. For example, the present invention is also applicable to a case where the UE is powered off.

Further, in the wireless communication system according to the embodiment of the present invention, the L-GW 102 is configured to, after releasing the LIPA resource, transmit the resource release completion notification to the HeNB 101. However, the present invention is not limited thereto. The L-GW 102 may be configured so as not to transmit the resource release completion notification to the HeNB 101.

Further, in the wireless communication system according to the embodiment of the present invention, regarding the handover operation, switching of the wireless base station device to be a communication partner for the UE is performed at the initiative of the wireless base station device. However, the present invention is not limited thereto. The UE may take the initiative in switching the wireless base station device to be a communication partner for the UE.

In addition, the eNB 106 may perform the same operation as that of the HeNB 101 according to the embodiment of the present invention.

In 3GPP (Third Generation Partnership Project) SPEC TS22.220, femto cells and access modes thereof are described as follows. That is, a femto base station is customer premises equipment that connects a wireless terminal device connected via a wireless interface, to a mobile communications carrier network by using an IP backhaul.

Regarding the access modes of the femto cells, a femto base station in a closed access mode provides services to only associated CSG (Closed Subscriber Group) members. A femto base station in a hybrid mode provides services to associated CSG members and to non-CSG members. A femto base station in an open access mode operates as a normal base station.

Such a definition based on the 3GPP may be applied to the wireless communication system according to the embodiment of the present invention.

Further, the following definitions may be applied in combination with or separately from the above definition.

A macro base station is a wireless base station device under the control of a communications carrier, and wireless base station devices that subscribe to the communications carrier are allowed to access the macro base station. Further, it is considered that a macro base station is basically not powered off.

On the other hand, a femto base station is a wireless base station device that is mainly installed in a personal or corporate building, and is likely to be moved or powered off depending on user's circumstances.

Further, the femto base station operates in any of the open, hybrid, and closed access modes. When the femto base station operates in the closed access mode, only registered members (terminals) are allowed to access the femto base station. When the femto base station operates in the closed access mode, the femto base station provides services to only the registered members. When the femto base station operates in the hybrid mode, the femto base station provides services to both the registered members and unregistered members, i.e., non-members. When the femto base station operates in the open access mode, the femto base station operates in the same manner as the macro base station.

The embodiment described above is to be considered in all respects as illustrative and not restrictive. The scope of the present invention is indicated by the appended claims rather than by the foregoing meaning, and all changes which come within the meaning and range of equivalency of the claims are therefore intended to be embraced therein.

DESCRIPTION OF THE REFERENCE CHARACTERS

51 LAN (internal network)
52 IP network (external network)
101 HeNB (wireless base station device)
102 L-GW (internal network connection device)
103 MME
104, 105 S-GW (communication control device)
106 eNB (wireless base station device)
107 P-GW
150, 151 UE
201 wireless communication system

The invention claimed is:

1. A communication system including a wireless base station device for transmitting/receiving a radio signal to/from a wireless terminal device, and an internal network connection device connected between the wireless base station device and an internal network, wherein
the internal network connection device
allocates, to the wireless terminal device, its own resource for communicating with a terminal device in the internal network,
transmits data received from the wireless terminal device via the wireless base station device, to the terminal device in the internal network, and
transmits data received from the terminal device in the internal network, to the wireless terminal device via the wireless base station device,
the internal network connection device or the wireless base station device determines whether or not the allocation of the resource to the wireless terminal device should be maintained, and
upon receiving a determination that the allocation of the resource should not be maintained, the internal network connection device cancels the allocation of the resource.

2. The communication system according to claim 1, wherein
when communication between the wireless terminal device and the terminal device in the internal network via the internal network connection device has not been performed for a predetermined time or more, the internal network connection device or the wireless base station device determines that the allocation of the resource to the wireless terminal device should not be maintained.

3. The communication system according to claim 1, wherein
when the wireless terminal device has become incommunicable with the wireless base station device, the wireless base station device determines that the allocation of the resource to the wireless terminal device should not be maintained.

4. The communication system according to claim 1, wherein
when the wireless terminal device is not communicable with the wireless base station device, and communication between the wireless terminal device and the terminal device in the internal network via the internal network connection device has not been performed for a predetermined time or more, the internal network connection device or the wireless base station device determines that the allocation of the resource to the wireless terminal device should not be maintained.

5. The communication system according to claim 4, wherein
in the state where the communication has not been performed for the predetermined time or more, the wireless base station device confirms whether or not the wireless terminal device is communicable with the wireless base station device, and
when the wireless terminal device is not communicable with the wireless base station device, the wireless base station device determines that the allocation of the resource to the wireless terminal device should not be maintained.

6. The communication system according to claim 4, wherein
when the communication between the wireless terminal device and the terminal device in the internal network via the internal network connection device has not been performed for the predetermined time or more after the wireless terminal device became incommunicable with the wireless base station device, the internal network connection device or the wireless base station device determines that the allocation of the resource to the wireless terminal device should not be maintained.

7. The communication system according to claim 1, wherein
when a predetermined time has elapsed from when communication between the wireless terminal device and the terminal device in the internal network via the internal network connection device became not to be performed, the internal network connection device or the wireless base station device determines that the allocation of the resource to the wireless terminal device should not be maintained, and
when the wireless terminal device has become incommunicable with the wireless base station device, even if the predetermined time has not elapsed from when the communication became not to be performed, the wireless base station device determines that the allocation of the resource to the wireless terminal device should not be maintained.

8. The communication system according to claim 1, wherein
when the wireless terminal device performs handover to another wireless base station device, the wireless base station device transmits, to the internal network connection device, a resource release request indicating a request to cancel the allocation of the resource to the wireless terminal device, in advance of or in parallel with transmitting, to the wireless terminal device, a handover instruction indicating an instruction that causes the wireless terminal device to perform handover, and upon receiving the resource release request, the internal network connection device cancels the allocation of the resource.

9. The communication system according to claim 1, wherein when the wireless terminal device performs handover to another wireless base station device, if communication between the wireless terminal device and the terminal device in the internal network via the internal network connection device has not been performed for a predetermined time or more from when the wireless base station device transmitted, to the wireless terminal device, a handover instruction indicating an instruction that causes the wireless terminal device to perform handover, the wireless base station device transmits, to the internal network connection device, a resource release request indicating a request to cancel the allocation of the resource to the wireless terminal device, and upon receiving the resource release request, the internal network connection device cancels the allocation of the resource.

10. The communication system according to claim 1, wherein the communication system includes a communication control device connected between the wireless base station device and an external network, and includes a plurality of the wireless base station devices, a plurality of the communication control devices are provided, and at least two of the wireless base station devices are connected to different communication control devices, respectively.

11. The communication system according to claim 1, wherein the wireless base station device is a HeNB (Home e NodeB) defined in 3GPP, and the internal network connection device is an L-GW (Local Gateway) defined in 3GPP.

12. The communication system according to claim 10, wherein the communication control device is an S-GW (Serving Gateway) defined in 3GPP.

13. A resource control method used in a communication system including: a wireless base station device for transmitting/receiving a radio signal to/from a wireless terminal device; and an internal network connection device connected between the wireless base station device and an internal network, the internal network connection device transmitting data received from the wireless terminal device via the wireless base station device, to a terminal device in the internal network, and transmitting data received from the terminal device in the internal network to the wireless terminal device via the wireless base station device, the method comprising:

a step in which the internal network connection device allocates, to the wireless terminal device, its own resource for communicating with the terminal device in the internal network;

a step in which the internal network connection device or the wireless base station device determines whether or not the allocation of the resource to the wireless terminal device should be maintained; and a step in which the internal network connection device cancels the allocation of the resource, upon receiving a determination that the allocation of the resource should not be maintained.

* * * * *